United States Patent [19]

Leitner

[11] 4,299,582
[45] Nov. 10, 1981

[54] CHAIN DRIVE FOR MOTORCYCLE REAR WHEELS CARRIED BY SWING ARMS

[76] Inventor: Horst Leitner, Dr.-Th.-Körner-Strasse 33, Bruck, Mur, (Steiermark), Austria

[21] Appl. No.: 17,014

[22] Filed: Mar. 2, 1979

[30] Foreign Application Priority Data

Mar. 7, 1978 [AT] Austria ............................... 1629/78

[51] Int. Cl.³ ............................................ F16H 7/18
[52] U.S. Cl. .................................. 474/109; 180/227; 474/111
[58] Field of Search ............... 74/242.11 B, 242.11 C, 74/242.11 P, 242.11R; 180/227, 231; 280/284, 261; 474/109, 111, 133

[56] References Cited

U.S. PATENT DOCUMENTS

| | | | |
|---|---|---|---|
| 667,594 | 2/1901 | Soucy, Jr. ...................... | 280/261 X |
| 2,597,503 | 5/1952 | Larsson ........................ | 74/242.11 R |
| 3,819,002 | 6/1974 | Heathwaite et al. ............ | 180/227 |
| 3,834,246 | 9/1974 | McGilp ........................ | 74/242.11 B |
| 4,034,821 | 7/1977 | Stoddard et al. ........ | 74/242.11 B X |
| 4,069,719 | 1/1978 | Cancilla ...................... | 74/242.11 B |

FOREIGN PATENT DOCUMENTS 907726 2/1954 Fed. Rep. of Germany .
135910 12/1979 Sweden .
223559 3/1925 United Kingdom ................ 280/284

OTHER PUBLICATIONS

Japanese Patent Application, 51-42387, (Now Known as Patent 865,227)

Primary Examiner—C. J. Husar
Assistant Examiner—Conrad Berman
Attorney, Agent, or Firm—Martin A. Farber

[57] ABSTRACT

A chain drive is proposed for motorcycle rear wheels carried by swing arms. The chain is deflected by means which are rigidly secured to a swing arm carrying the rear wheel so that the resiliency of the rear wheel suspension is independent of the forces exerted by the chain during an acceleration and deceleration of the motor.

11 Claims, 3 Drawing Figures

CHAIN DRIVE FOR MOTORCYCLE REAR WHEELS CARRIED BY SWING ARMS

This invention relates to a chain drive for motorcycle rear wheels carried by swing arms.

An important problem arising with chain drives for motorcycle rear wheels carried by swing arms resides in that the spring suspension of the rear wheel is influenced by an acceleration or deceleration of the motor. This influence on the resilient suspension of the rear wheel is particularly undesirable when the motorcycle is driven on rough ground. Swiss Patent Specification No. 135,910 discloses a motorcycle which has a frame consisting of two members, which are connected by a hinge. A motor is carried by and rigidly connected to the forward frame member. The drive chain is trained around the chain sprocket secured to the rear wheel, the output pinion of the motor, and a guide sprocket, which is secured to the forward frame member by means of a transverse sleeve. In addition to the motor output pinion, which is rigid with the frame, Swiss Patent Specification No. 135,910 calls for only one guide pulley which is rigid with the frame, so that the spring suspension of the rear wheel is not yet entirely independent of the forces exerted by the chain. This is due to the fact that in the arrangement, according to Swiss Patent Specification No. 135,910, the desired result depends highly on the relative position of the two frame members (extent of deflection against spring force) because the chain is deflected only at one point and the chain-deflecting means are secured to the forward frame member, which carries the motor. It is an object of the invention to provide a chain drive which is free from the disadvantages mentioned above.

This is accomplished according to the invention in that the upper and lower courses of the drive chain are trained around chain-deflecting means which are rigidly secured to a swing arm and are spaced apart above and below the swing arm bearing, respectively. Because the chain is trained around chain-deflecting means secured to a swing arm, the spring suspension is not influenced by the acceleration or deceleration of the motor so that the ground adhesion of the rear wheel is much improved. This results in a safer riding because higher rates of acceleration and deceleration are enabled as well as an improved lateral control also of the rear wheel. It is essential that the chain-deflecting means are secured to the swing arm on both sides of the swing arm bearing rather than to the frame of the motorcycle.

In a desirable arrangement within the scope of the invention, the distance between the chain-engaging surfaces of the chain-deflecting means is substantially as large as the diameter of the chain sprocket secured to the rear wheel.

In a simple embodiment, the chain-deflecting means may consist of slideway members made, e.g., of plastics material.

Usually the chain deflecting means will consist of wheels, particularly of chain sprockets.

Further details and features of the invention will become apparent from the following description of an illustrative embodiment shown on the accompanying drawing, in which FIG. 1 is a simplified showing of a motorcycle provided with a chain drive according to the invention;

Figure 1:
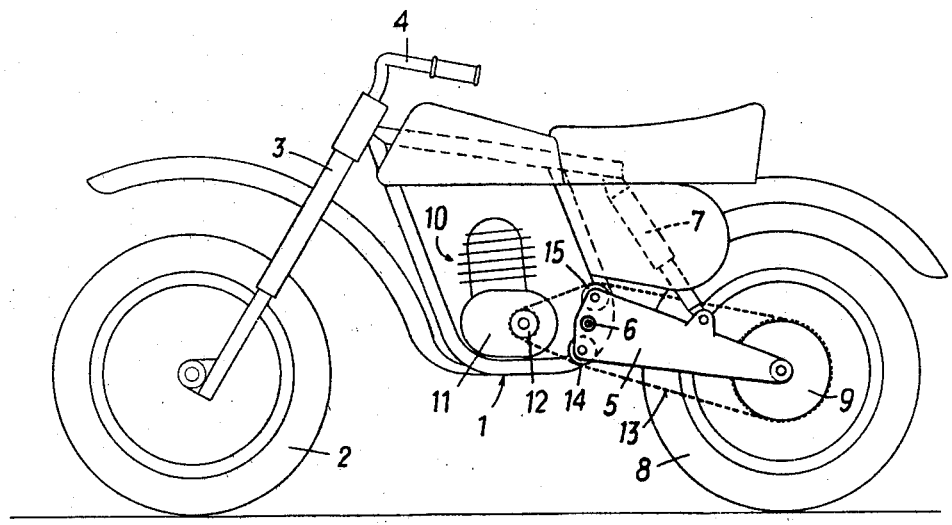
Figure 2:
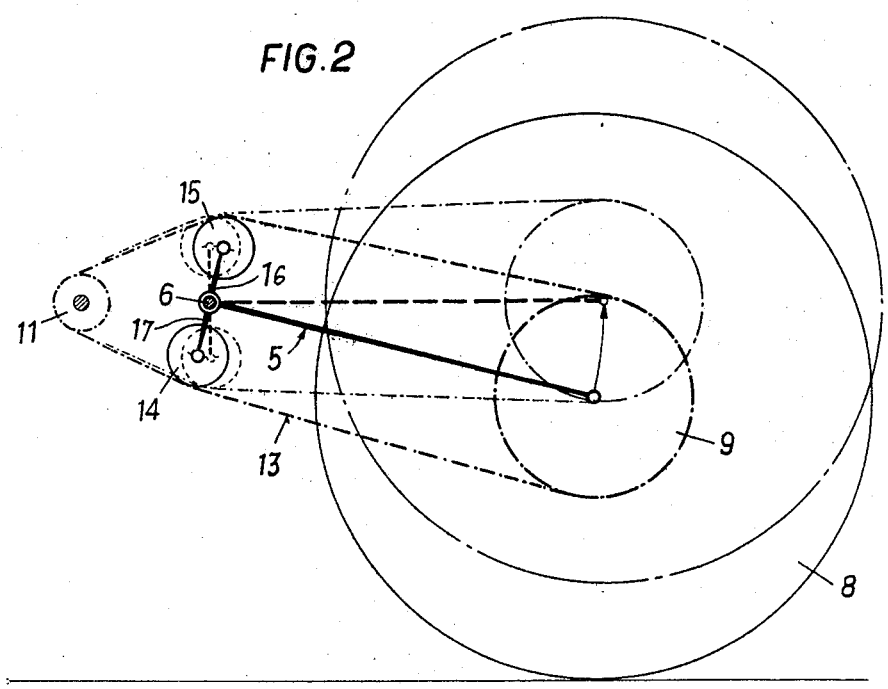
FIG. 2 is a diagrammatic representation of the chain drive.
Figure 3:
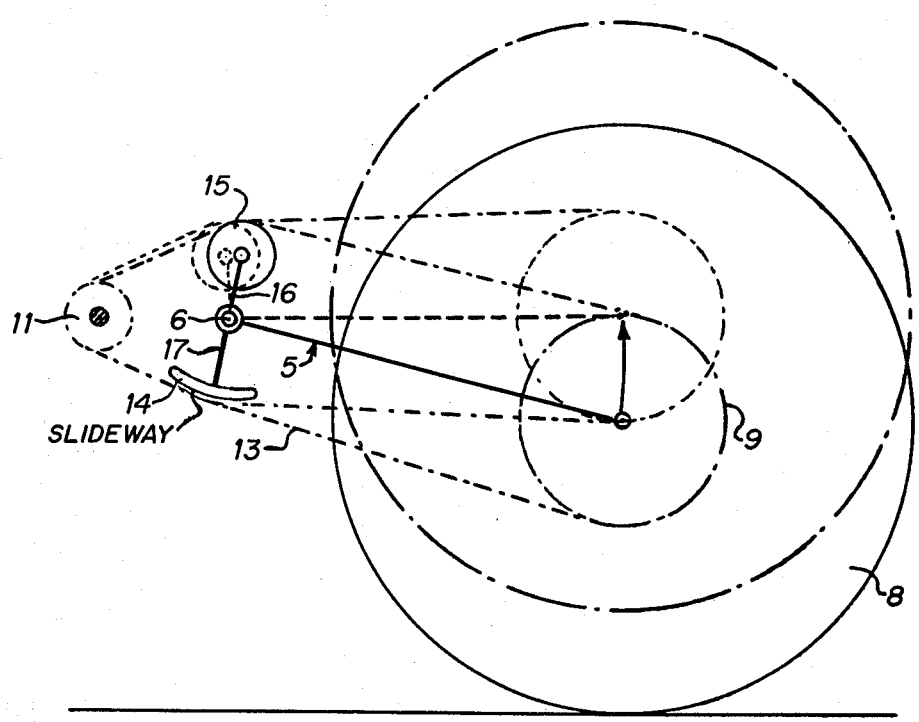
FIG. 3 is diagramatic representation of a portion of FIG. 2 but showing a slideway member.

The motorcycle shown in FIG. 1 may be used for trial sport. The motorcycle has a frame 1 and a front wheel 2, which is secured to the frame 1 by a front wheel fork 3. The latter carries at its top a handlebar 4.

A swing arm 5 is pivoted to the frame 1 by a swing arm bearing 6 and is also connected to the frame 1 by a spring strut 7, which incorporates a shock absorber. A rear wheel 8 is mounted in the usual manner at the free end of the swing arm 5 and provided with a chain sprocket 9.

As is diagrammatically indicated in FIG. 1, a motor 10 provided with a transmission 11 is mounted in the frame 1. The transmission 11 carries an output chain sprocket 12. A drive chain 13 is trained around the output sprocket 12 and the sprocket 9 carried by the rear wheel.

In accordance with the invention, the drive chain 13 is trained around two chain-deflecting means, which are mounted on the swing arm 5 and in the embodiment shown, by way of example, consist of chain sprockets 14 and 15. Alternatively, the means for deflecting the drive chain 13 which are secured to the swing arm 5 may consist of slideway members of plastics material.

The two chain sprockets 14 and 15 are mounted on the swing arm 5 on both sides of the swing arm bearing 6 and are symmetrical to the latter and spaced from it so that the distance of their chain-engaging surfaces, measured at right angles to the swing arm 5, is substantially as large as the diameter of the chain sprocket 9. The axes of the chain sprockets 14 and 15 lie in a plane which is at right angles to the longitudinal direction of the swing arm 5 and which contains also the axis of the swing arm bearing 6. Mounting arms 16 and 17 together with the swing arm 5 are pivotally mounted about the swing arm bearing 6. The chain sprockets 14 and 15 constitute chain contact members and are mounted on the arms 16 and 17, respectively, these arms together constituting a member rigidly connected with the swing arm 5 and a portion of the chain-deflecting means. FIG. 1 shows that this member which carries the sprockets 14 and 15 is integral in one piece with the swing arm 5.

In the chain drive according to the invention, the chain sprockets 14 and 15 or slideway members for deflecting the drive chain 13 cause the swing arm bearing 6 to take up the tensile force which is exerted by the chain when the motor is accelerated or decelerated so that this will not influence the swing arm. In a conventional chain drive, the tensile force exerted by the chain during an acceleration was transmitted to the swing arm so that the same was raised or lowered in dependence on the direction in which it was loaded, i.e., on the arrangement of the swing arm bearing above or below the imaginary straight line connecting the axis of the output sprocket and the axis of the rear wheel. Similar remarks are applicable with respect to the tension exerted by the drive chain during a deceleration of the motor.

If motorcycles are to be subsequently provided with the chain-deflecting means according to the invention, it is recommended to provide a bracket which carries, e.g, the deflecting sprockets, and to secure said bracket to the swing fork for the rear wheel, e.g., by means of clamp screws. The bracket is desirably clamped to the rear wheel swing fork at the tubular portion thereof, by which the swing fork is secured to the frame.

Herein the chain 13 and sprockets 12 and 9 are to be understood as any endless belt type transmission means, for example only, such as a chain and cooperating transmission wheels.

I claim:

1. A chain drive for motorcycle rear wheels carried by swing arms mounted on a frame by a swing arm bearing, comprising
 a swing arm is pivotally mounted on the swing arm bearing on the frame,
 a rear wheel chain sprocket is disposed on said swing arm,
 two chain-deflecting means at least in part are rigidly secured to said swing arm and are spaced apart substantially directly above and below the swing arm bearing respectively on both sides thereof,
 a drive chain having upper and lower courses trained around both of said chain-deflection means at contact points therewith,
 said chain-deflecting means are aligned relative to said swing arm bearing such that an imaginary line between said contact points of said upper and lower courses of said drive chain with said two chain-deflecting means respectively substantially passes through said swing arm bearing.

2. A chain drive according to claim 1, characterized in that the distance between the chain-engaging surfaces of the chain-deflecting means is substantially as large as the diameter of the chain sprocket secured to the rear wheel.

3. A chain drive according to claim 1 or 2, wherein at least one of the chain-deflecting means comprise a slideway member.

4. A chain drive according to claim 1 or 2, wherein said chain-deflecting means comprise rotatably mounted wheels.

5. A chain drive according to claim 4, characterized in that the chain-deflecting means comprising two chain sprockets, which are symmetrical to the swing arm bearing and have axes lying on a plane which is at right angles to the longitudinal direction of the swing arm and which contains also the axis of the swing arm bearing.

6. A motorcycle having a rear wheel carried by swing arms, including a chain drive according to claims 1, 2 or 5 further comprising the frame and swing arm bearing mounted on the frame and motor means for driving said drive chain.

7. A chain drive according to claim 4, wherein said wheels comprise chain sprockets.

8. The chain drive according to claims 1 or 5, wherein the drive chain forms substantially a parallelogram.

9. The chain drive as set forth in claim 1, wherein each of said chain-deflecting means respectively press said upper and lower courses of the drive chain outwardly apart from one another.

10. A drive chain according to claim 1, comprising a member rigidly connected to said swing arm,
 said chain-deflecting means are mounted on said member spaced apart from one another between the upper and lower courses of said drive chain and pressing said upper and lower courses outwardly apart from one another.

11. A chain drive according to claim 2, further comprising
 said chain-deflecting means include,
 mounting arms rigidly connected with said swing arm,
 said mounting arms are pivotable about said swing arm bearing,
 chain contact members mounted on said mounting arms, respectively.

* * * * *